United States Patent
Rostron

(10) Patent No.: US 6,868,067 B2
(45) Date of Patent: Mar. 15, 2005

(54) HYBRID AGENT-ORIENTED OBJECT MODEL TO PROVIDE SOFTWARE FAULT TOLERANCE BETWEEN DISTRIBUTED PROCESSOR NODES

(75) Inventor: Andy E. Rostron, Everett, WA (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 10/183,488

(22) Filed: Jun. 28, 2002

(65) Prior Publication Data

US 2004/0001431 A1 Jan. 1, 2004

(51) Int. Cl.[7] .................................................. H04J 1/16
(52) U.S. Cl. ........................ 370/241; 370/352; 370/386; 379/1.03
(58) Field of Search ................................. 370/216–218, 370/241–248, 252, 250, 386, 352, 249, 219, 220–228; 707/104; 379/1.03, 32.01; 709/223; 714/4, 3, 2, 31, 26; 345/357

(56) References Cited

U.S. PATENT DOCUMENTS

| | | | |
|---|---|---|---|
| 5,404,465 A | 4/1995 | Novakovich et al. | |
| 5,513,343 A | 4/1996 | Sakano et al. | |
| 5,729,472 A | 3/1998 | Seiffert et al. | |
| 5,787,409 A | 7/1998 | Seiffert et al. | |
| 5,799,317 A | * 8/1998 | He et al. | 707/104.1 |
| 6,012,152 A | * 1/2000 | Douik et al. | 714/26 |
| 6,108,616 A | 8/2000 | Borchers et al. | |
| 6,212,649 B1 | * 4/2001 | Yalowitz et al. | 714/31 |
| 6,247,139 B1 | * 6/2001 | Walker et al. | 714/2 |
| 6,460,144 B1 | 10/2002 | Ashcroft et al. | |

* cited by examiner

Primary Examiner—John Pezzlo
(74) Attorney, Agent, or Firm—Duane Morris LLP

(57) ABSTRACT

An apparatus and method for a computer system is used for implementing an extended distributed recovery block fault tolerance scheme. The computer system includes a supervisory node, an active node and a standby node. Each of the nodes has a primary routine, an alternate routine and an acceptance test for testing the output of the routines. Each node also includes a device driver, a monitor and a node manager for determining the operational configuration of the node. The supervisory node coordinates the operation of the active and standby nodes. The primary and alternate routines are implemented with an application task through a plurality of agent objects operating as finite state machines. A reliable data link extends between the monitors of the active and standby nodes.

50 Claims, 7 Drawing Sheets

| | 7 | 6 | 5 | 4 | 3 | 2 | 1 | 0 | |
|---|---|---|---|---|---|---|---|---|---|
| Address 501 | SAPI (slot) | | | | 503 TEI (port) | | | 504 C/R 502 | Octet 1 |
| Unnumbered Frame Format 510 | FUNC | | | | P/F | 1 | 1 | Octet 2 |
| Supervisory Frame Format 520 | Reserved | | N(R) | | | SUP | 0 | 1 | Octet 3 |
| | | | | | | | | P | 3 |
| Heartbeat Information Frame Format (numbered) 530 | N(S) | | | | | | | 0 | Octet 2 |
| | N(R) | | | | | | | P | 3 |
| | K1 | | | | | | | | 4 |
| | K2 | | | | | | | | 5 |
| | STATUS | | | | | | | | 6 |
| FCS 540 | | | | | | | | | n |

FIGURE 5

HYBRID AGENT-ORIENTED OBJECT MODEL TO PROVIDE SOFTWARE FAULT TOLERANCE BETWEEN DISTRIBUTED PROCESSOR NODES

CROSS REFERENCE TO RELATED APPLICATIONS

The present application is related to co-pending and commonly assigned PCT International Application No. PCT/US02/03323 entitled "Dynamic Bandwidth Allocation", PCT/US02/03322 entitled "Demodulator Bursty Controller Profile", PCT/US02/03193 entitled "Demodulator State Controller", PCT/US02/03189 entitled "Frame to Frame Timing Synchronization", the disclosures of which are hereby incorporated herein by reference. The aforementioned applications are related to commonly assigned U.S. Pat. No. 6,016,313 entitled "System and Method for Broadband Millimeter Wave Data Communication" issued Jan. 18, 2000 and currently undergoing two re-examinations under application Ser. No. 90/005,726 and application Ser. No. 90/005,974, U.S. Pat. No. 6,404,755 entitled "Multi-Level Information Mapping System and Method" issued Jun. 11, 2002, U.S. patent application Ser. No. 09/604,437, entitled "Maximizing Efficiency in a Multi-Carrier Time Division Duplex System Employing Dynamic Asymmetry", which are a continuation-in-part of the U.S. Pat. No. 6,016,313 patent which are hereby incorporated herein by reference.

The present application is related to and is being concurrently filed with commonly assigned U.S. patent application Ser. No. 10/183,383, entitled "Look-Up Table for QRT"; U.S. patent application Ser. No. 10/183,486, entitled "Airlink TDD Frame Format"; U.S. patent application Ser. No. 10/183,492, entitled, "Data-Driven Interface Control Circuit and Network Performance Monitoring System and Method"; U.S. patent application Ser. No. 10/183,490, entitled "Virtual Sector Provisioning and Network Configuration System and Method", U.S. patent application Ser. No. 10/183,489, entitled "System and Method for Supporting Automatic Protection Switching Between Multiple Node Pairs Using Common Agent Architecture", U.S. patent application Ser. No. 10/183,384, entitled "System and Method for Transmitting Highly Correlated Preambles in QAM Constellations", the disclosures of which is hereby incorporated herein by reference.

BACKGROUND OF THE INVENTION

A distributed recovery block is a method of integrating hardware and software fault tolerance in a single structure without having to resort to N-version programming. In N-version programming, the goal is to design and code the software module n times and vote on the n results produced by these modules. The recovery block structure represents a dynamic redundancy approach to software fault tolerance. In dynamic redundancy, a single program or module is executed and the result is subject to an acceptance test. Alternate versions are invoked only if the acceptance test fails. The selection of the routine is made during program execution. In its simplest form as shown in FIG. 1, a standard recovery block structure 100 consists of: a primary routine 110, which executes critical software function; an acceptance test 120, which test the output of the primary routine after each execution; at lease one alternate routine 115 that performs the same function as the primary routine and is invoked by the acceptance test 120 upon detection of a failure.

In a distributed recovery block 101 the primary and alternate routines are both replicated and are resident on two or more nodes interconnected by a network. This technique enables standby sparing fault tolerance where one node 105a (the active node) is designated primary and another node 105b (the standby node) is a backup. Under fault-free circumstances, the primary node 105a runs the primary routine 110 whereas the backup node 105b runs the alternate routine 115 concurrently.

In case of a failure, the primary node 105a attempts to inform the backup through the monitor 108 via the heartbeat thread 107. When the backup receives notification, it assumes the role of the primary node. Since the backup node has been processing the alternate routine 115 concurrently, a result is available immediately for output. Subsequently, recovery time for this type of failure should be much shorter than if both blocks were running on the same node. If the primary node 105a stops processing entirely, no update message will be passed to the backup. The backup detects the crash by means of a local timer in which timer expiry constitutes the time acceptance test.

The failed primary node transitions to a backup node, and by employing a recovery block reconfiguration strategy both nodes can be assured to not be executing the same routine.

A distributed recovery block with real time process control is referred to as an extended distributed recovery block (EDRB) 102. The EDRB includes a supervisor node 103 connected to the network to verify failure indications and arbitrate inconsistencies; and regular, periodic heartbeat status messages.

In EDRB, nodes responsible for control of the process and related systems are called operational nodes and are critical. The operational nodes perform real time control and store unrecoverable state information. A set of dual redundant operational nodes is called a node pair. Multiple redundant operation nodes are node sets.

Regular, period status messages are exchanged between node pairs and each node pair in a node set. The messages are referred to as heartbeats. A node is capable of recovering from failures in its companion in standalone fashion, if the malfunction has been declared as part of the heartbeat message. If a node detects the absence of it companion's heartbeat, it request confirmation of the failure from a second kind of node called the supervisor. Although the supervisor is important to EDRB operation, the supervisor node 103 is typically not crucial because its failure only impacts the ability of the system to recover from failures require its confirmation or arbitration. The EDRB system can continue to operate without a supervisor 103 if no other failures occur.

In FIG. 1 the software structure in a node pair is shown. Operational nodes employ active redundancy. One node pair member is always active, the other is always standby if, it is functional. The active node 105a executes a primary version of a control process in parallel with an alternate version executed on the standby node. Both nodes check the correctness of the control outputs with the acceptance test 120.

Within an operational node, the EDRB is implemented as a set of processes communicating between node pairs and the supervisor 103 to control fault detection and recovery. The two processes responsible for node-level fault decision making are the node manager 106 and the monitor 108. The node manager 106 determine the role of the local node (active or standby) and subsequently triggers the use of either the primary 110 or the alternate routine 115. If the primary routine acceptance test is passed, the node manager 106 permits a control signal to be passed to the device drivers 130 under its control. If the acceptance test is not passed, the active node manager 106a request the standby node manager to promote itself to active and immediately send out its result to minimize recovery time.

The monitor 108 associated with node manager 106 is concerned primarily with generating the heartbeat and determining the state of the companion node. The heartbeat is a ping or other rudimentary signal indicating functionality of the respective node. When an operational node fails to issue a heartbeat, the monitor processes request permission from the supervisor to assume control if not already in the active role. If the supervisor 103 concurs that a heartbeat is absent, consent is transmitted and the standby node 105b promotes itself to active node.

If the active node 105a spuriously decides to become a standby node or a standby node makes an incorrect decision to assume control. As a response the supervisor node 103 will detect the problem form periodic status reports. It will then send an arbitration message to the operation nodes in order to restore consistency.

In many computer networks, particularly in communication system, the supervisory node 103 is critical, providing frame synchronization and connection routes between the network and users. Thus, the loss of a supervisory node results in loss of the node function. Thus, there is a need for a multiple redundant architecture in which not only are the nodes replicated, but also the network. In addition there is a need for implementation of agent oriented software to facilitate the functionality of such an architecture.

SUMMARY OF THE INVENTION

An object of the invention is an improvement of a computer system implementing an extended distributed recovery block fault tolerance scheme comprising a supervisory node, an active node and a standby node. The active and standby node have a primary routine for executing a software function; an alternate routine for executing the software function; and an acceptance test routine for testing the output of the primary routine and providing a control signal in response thereto. The active and standby nodes also having a device driver for receiving the control signal, a monitor for communicating state information with one or more active or standby nodes, and are operationally connected to a node manager for determining the operational configuration of the node. The primary routine is executed in response to a determination that the node is in an active state and the alternate routine is executed in response to a determination that the node is in a standby state. The supervisory node coordinates the operation of the active node and the standby node. The improvement being the primary and alternate routines of one of the active or standby node are implemented with an application task comprising a plurality of agent objects each operating as a finite state machine operating in either a primary mode executing the primary routine or in an alternate mode executing the alternate routine.

Another object of the invention is an improvement of a computer system implementing an extended distributed recovery block fault tolerance scheme comprising a supervisory node, an active node, and a standby node. The improvement being the primary and alternate routines of the active and standby nodes are each implemented with a plurality of dedicated application tasks each with a plurality of agent objects operating as a finite state machine in either a primary mode executing the primary routine or in an alternate mode executing the alternate routine. The determination of the mode of operation of the agents in a one of the plural dedicated application tasks is determined independently of the mode of operation of the agents in the other of the plural dedicated application tasks.

Still another object of the invention is an improvement of a computer system implementing an extended distributed recovery block fault tolerance scheme having a supervisory node, an active node, and a standby node. The improvement being a primary and alternate routines of the active and standby nodes are each implemented with a plurality of dedicated application tasks each with a plurality of agent objects operating as a finite state machine operating in either a primary mode executing the primary routine or in an alternate mode executing the alternate routine. Each of the agents is implemented with an attachment list comprising data common to the attachment list of at least one other agent.

Yet another object of the invention is an improvement of a single bus software architecture for supporting hardware hot standby redundancy with a supervisor processing node. The improvement of adding a second supervisor processor node, alternatively in an active state, connected to the bus to provide for a redundant supervisory node set.

Another object of the invention is an improvement of a communication system with an active node and a standby node that form a node pair or node set, each node with a node agent. The improvement of using a reliable datalink between the heartbeat monitors of the node pair or set.

Another object of the invention is an improvement of a communication system with an active node and a standby node that form a node pair or node set, each node with a node agent. The improvement involving supporting automatic protection switching between multiple node sets or pairs using common agent architecture.

BRIEF DESCRIPTION OF THE DRAWINGS

FIG. 5 is a representation of an exemplary heartbeat message cell.

DETAILED DESCRIPTION

The implementation of EDRB of the present invention employs a hybrid solution, as it blends the agents with the structure and control of the EDRB. Application tasks are implement by agent objects that are instances of C++ programming. The agent objects (agents) are implemented as finite state machines (circuit state machines) that recognized two distinct modes of operation. One mode executes a primary routine block; the other executes an alternate routine block. An application task performs the acceptance test block and outputs the results for use by the node manager in that processor node.

Figure 1:
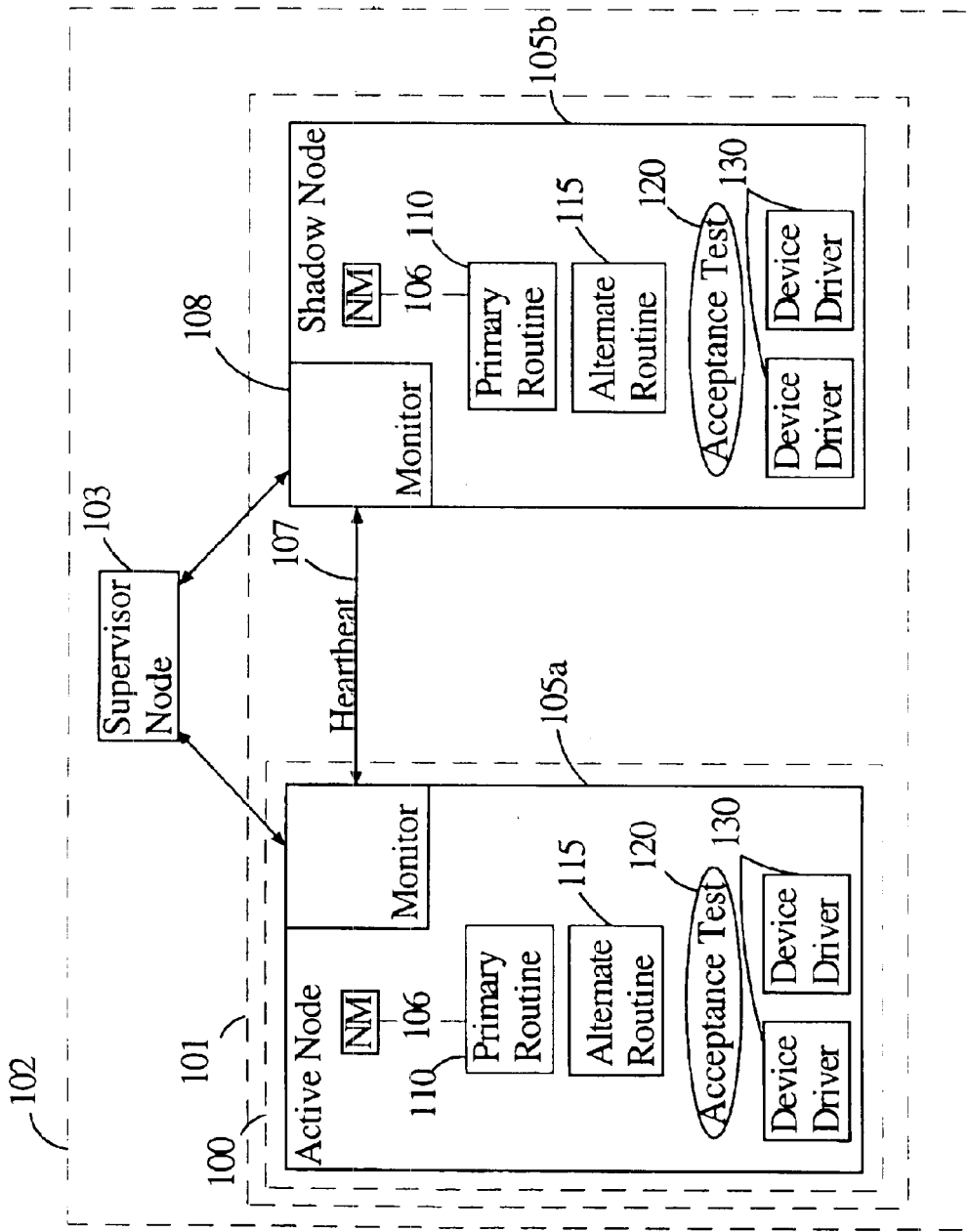
FIG. 1 is an illustration of an extended distributed recovery block EDRB.
Figure 2:
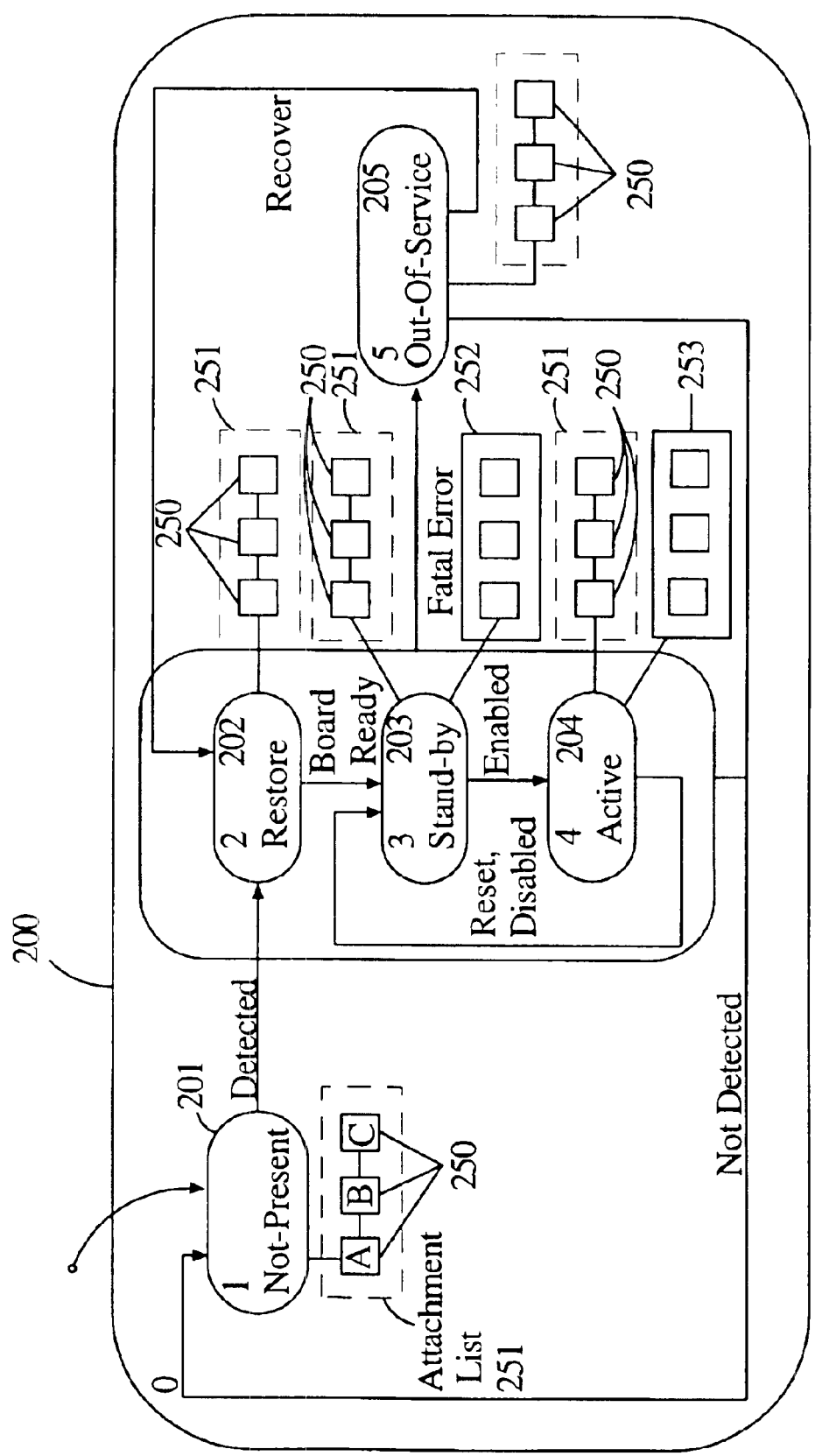
FIG. 2 is a representation of an exemplary state transition diagram for Agent Objects.

A circuit state machine 200, an example of which is shown in FIG. 2, implementing the agent objects is comprised of 5 states including Not-Present 201, Restore 202, Stand-by 203, Active 204, and Out of Service 205. The circuit state machines are not limited to these states, more or less states are envisioned as required in certain applications.

The circuit state machines begin in the NOT PRESENT state 201 and stays in this state until a detected event is received. Once detected, the RESTORE State 202 is entered where the circuit is reset and circuit initialization is performed. This transition can include successful diagnostic test execution as part of the initialization sequence. If a problem arises during the transition, the state machine may be transitioned to the OUT OF SERVICE State 205 to await further instructions. The OUT OF SERVICE State 205 is a holding state for situations where fatal or unrecoverable errors have occurred. It is also a deliberate state to enter when conducting diagnostic test or when attempting to restore normal operation.

The circuit state machine will stay in the RESTORE State 202 until a ready event is received. A time can be provided to allow adequate time for concurrent activity that may be required to initialize a circuit. Upon expiry the state machine automatically transition to the OUT OF SERVICE State 205.

Upon receipt of a ready event, the circuit state machine transition to the STAND-BY state 203. In STAND-BY State 203 the circuit is identified as operation, but not in service for normal use. The circuit state machine stays in the STAND BY state until an enable event is received, where it transition to the ACTIVE state 204. The ACTIVE State 204 represents the state when the circuit is operational i.e. routing traffic, monitoring defects, counting errors, and so on.

Software implements the circuit state machine state event matrix, event procedures and generic methods to provide a virtual behavior mechanism. The common Agent uses this generic behavior for software circuits, where blocks of executable code 250 perform as though they are hot-swappable components. In each of the state transitions depicted in FIG. 2, a chain of executable blocks of code are attached. These executable blocks of code are attachments which together an attachment list 251. When a state transition occurs, each attachment in the Attachment List 251 for that transition is executed in order. After each attachment runs, a status code is returned. If the status code is anything other than a success, execution of the chain is aborted.

Two additional execution chains are provided for handling the receipt of messages through he corresponding task service queue. One execution chain is provided for messages received when in the ACTIVE state, the other for messages received while in the STAND-BY state, these as discussed earlier are the primary and alternate routines, respectively.

When a message is received in the ACTIVE state, it is passed along to each attachment in the primary execution chain 253 until the end is reached or a routine returns unsuccessfully. Likewise, when a message is received while in the STAND-BY state, it is passed along to each attachment in the alternate execution chain (attachment list) 252. If a message is received while the state machine is in any other state, it is ignored. This supports the desired behavior where the agent object is only operational when it is active or stand-by.

Figure 3:
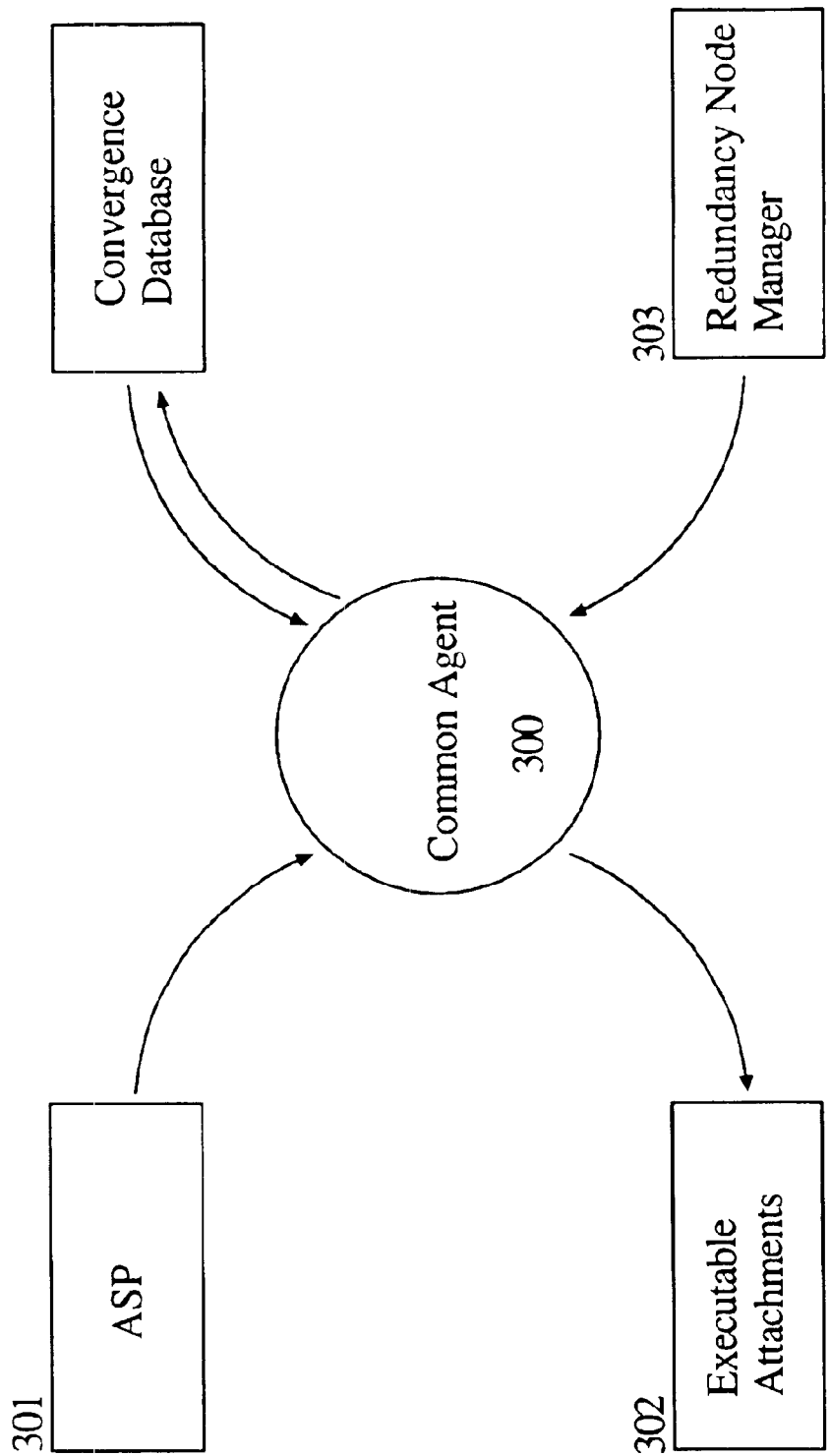
FIG. 3 is a common agent relationship diagram.

The common Agent object 300 relationship with neighboring external entities is shown in FIG. 3. The Application Support Package (ASP) subsystem 301 (a operating system utility to provide state machines) acts upon the agent object by invoking its operation during task initialization and through the processing of state event registered at startup. The Application Support Package (ASP) provides a generic task library that is used by application tasks. This library provides for a standardized internal task architecture and facilitates common software test hooks. The generic task interfaces with the application's implementation by means of specified user supplied hooks. The task library also uses all of the task level Runtime Library services that the application wishes to subscribe to. These services include Finite State Machine dispatch, and a guaranteed FSM timer service.

As state machine event transitions occur and as service queue task messages are received, the common Agent objects 300 acts on the executable blocks of code 302 attached at startup or at any point after startup. The circuit state machine behavior can be directed by a redundancy node manager 303 task during condition when system reconfiguration is required and resources in stand by become active for those that have failed. The redundancy node manager can issue commands to groups of agent objects instead of requiring software for each explicit function and procedure to invoke the reconfiguration process.

Common agent objects contain list of common Attachment objects which as discussed above are blocks of executable code. Agent objects may contain similar or application-specific attachments added in such a fashion as to perform their intended roles and inherently support the redundant system architecture. The Attachment lists are dynamically modifiable.

Figure 4:
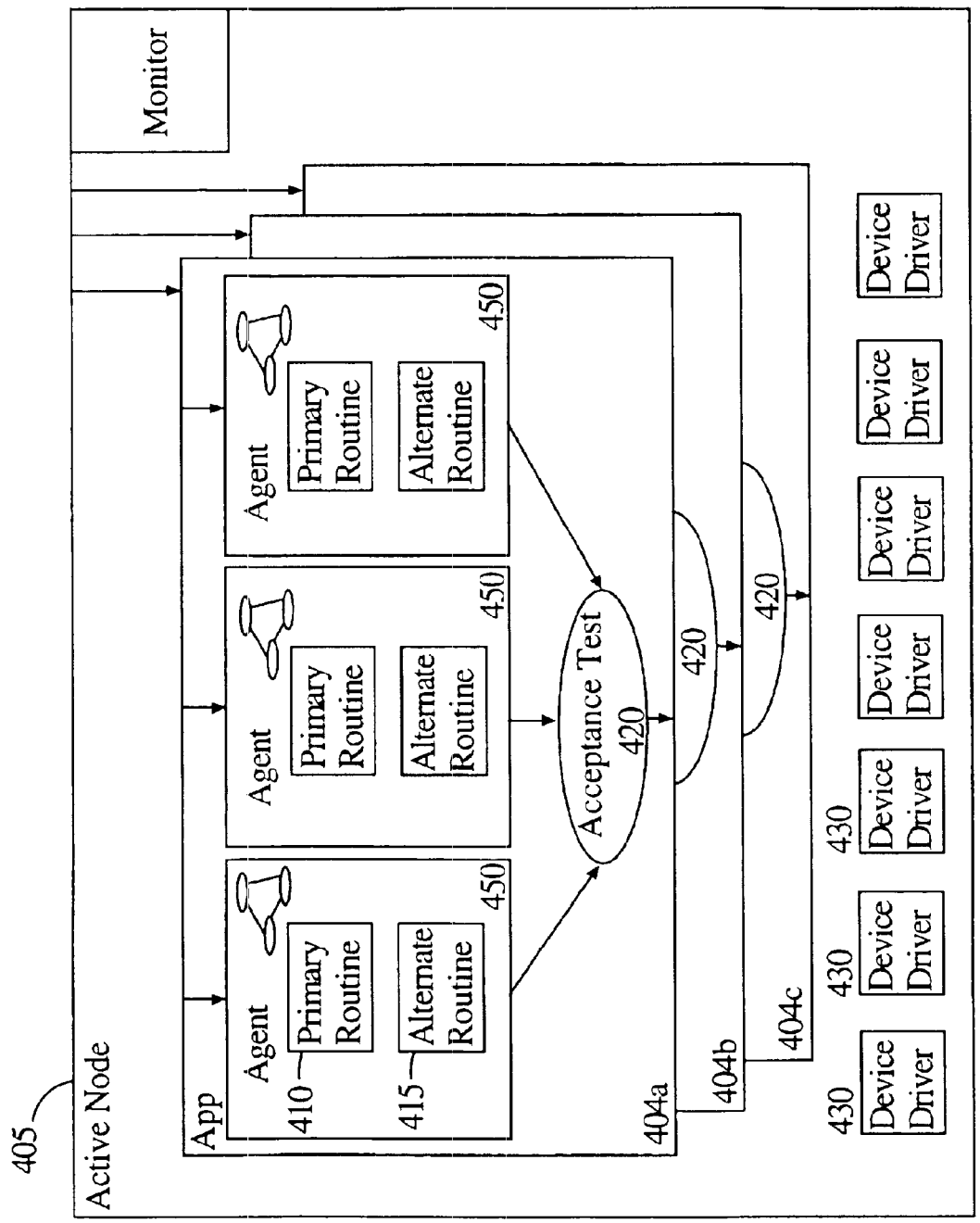
FIG. 4 is a representation of an exemplary node employing agent architecture.

FIG. 4 shows an example of an active or standby node 400, with a plurality of dedicated application tasks 404a–c, implemented with a plurality of Agents 450. The application tasks implement the primary and alternate routine of the active or standby node, via the agents. The agents 450 execute an attachment list for a primary 410 or alternate 415 routine within the application task. All subject to the acceptance test. A plurality of agents within an application task may run the primary or alternate routines, which may or may not have different attachment lists. The operation of the agents 450 in application task 404a are independent of the operation of the agents 450 in the other application tasks 404b, 404c etc.

A first set of Agents within an application task operate in the primary mode while the remainder of agents operate in the alternate mode. The agents are configured such that a number of agents in a second set backup a number of agents in the first set of agents. The number of agents in each set may or may not be equal; furthermore each agent of the second set of agents may back up each of the agents in the first set. Such a system allows for N- to M protection of the computer system at the application task level.

During system initialization, agents register data ownership and subscribe to data required for accomplishing assigned roles and processes. The data is common to all the agents. Blocks of the same executable code that are shared by the Agents are contained in common attachment lists. The Attachment lists are dynamically modifiable as a function of the status of the computer system.

One or more agent objects can implement each of the application tasks. The application tasks perform the acceptance test block 420 and output the results for use by the node manager in that processor node. The acceptance test block 420 is a test dedicated and contained within the application task. The node manager, upon acceptance sends the data to the respective one or more device drivers 430.

Each node in the node pair or set is connected to it companion as discussed above via a heartbeat thread to the monitor and the node agent of each companion node. The heartbeat thread carries a heartbeat signal. The heartbeat contains the node roles, version and frame number, which is incremented at the beginning of each new heartbeat frame. Preferably the heartbeat thread is a reliable datalink between the monitors of the node pair. For example, applying high-level data link control (HDLC) procedures would be a desirable implementation for the heartbeat thread, where the datalink message retransmission queues can be tuned to the needs of the system in a deterministic fashion. Such an implementation is illustrated in the heartbeat message cell of FIG. 5.

The content of the heartbeat message cell 500 is shown in FIG. 5 in octet format. The contents form either unnumbered 510, supervisory 520, or heartbeat information message 530 frames, depending on the state of the monitors in each participating node pair and an address frame 501. The message format enforces a level of integrity between node pairs to manage standby sparing activation a signaling between field replacement units (FRU). FRUs are units that service personnel can replace in the field. The message is terminated with a frame check sequence (FCS) field 540. Since this is a small message the FCS field 540 is an 8 bit sequence, invalid frames are frames which have fewer than 3 octets, contains a frame check sequence error, or contain an address that is not supported.

The address field 501 consists of a command/response bit (C/R) 502, a service access point identifier (SAPI) subfield 503 and a terminal endpoint identifier (TEI) subfield 504. The command/response bit identifies a frame as either a command or a response. The backup node sends commands with the C/R bit set to 0, and responses with the C/R bit set to 1. The primary node does the opposite, commands are sent with C/R set to 1 and responses are sent with C/R set to 0. In conformance with HDLC high-level data link control procedures) rules, both node pair entities us the same datalink connection identifier composed of the SAPI-TEI pair. The SAPI is used to correspond the processor node slot with the computer system connection. The TEI is used to map the connection to a specific network interface.

The unnumbered (U) format 510 is used to provide data link control function, primarily used in establishing and relinquishing link control. The Supervisory (S) format 520 is used to perform data link supervisory control function such as acknowledge I frames, request transmissions of I frames, and request temporary suspension of the transmission of I frames. The function of N(R) and P/F are independent. Each supervisory frame has an N(R) sequence number which may or may not acknowledge additional I-frames. The heartbeat information (I) format (I-frames) 530 is used to perform normal information transfer between node pairs or node sets regarding automatic protection switching and operational status. The function of N(S), N(R) and P are independent. Each I-frame has an N(S) sequence number, an N(R) sequence number which may or may not acknowledge additional I-frames, and a P bit that may be set to 0 or 1. K1 and K2 are signaling byte information maintained between node pairs and sets of node pairs.

The poll/final bit is incorporated in all frames. The P/F bit serves a function in both command frames and response frames. In command frames the P/F bit is referred to as the P bit)poll) in response frames it is referred to as the F bit (final) the P bit is set to 1 by a node pair to solicit a response frame from the peer node. The F bit is set to 1 by a node pair to a response frame transmitted as a result of a soliciting command.

The receive sequence number N(R) is the expected send sequence number of the next received I frame. At the time that an I or S frame is designated for transmission, the value of N(R) is equal to the number of I frames acknowledged by the node entity. N(R) indicates that the node entity transmitting the N(R) has correctly received all the I-frames numbered up to and including N(R)-1. The send sequence number N(S) is the send sequence number of transmitted I frames. It is only used in I-frames. At the time that an in-sequence I frame is designated for transmission, the value of N(S) is set equal to the current sequence number for the I frame to be transmitted.

The supervisory command sequence comprises receive ready, reject and receive not ready commands. The unnumbered control function include expand mode, disconnected mode, disconnect unnumbered acknowledgment and frame reject.

The EXPAND mode command is used to place the addressed backup or primary node into multiple frame acknowledged operation. A node pair confirms acceptance of any expand mode command by the transmission at the first opportunity of an unnumbered acknowledgement response. Upon acceptance of this command, the node pair entity sequence and transmission counter are set to 0. The transmission of an expand mode command indicates the clearance of all exception conditions. Exception conditions are delays, retransmit counters, erred messages of other condition outside of normal messages. Previously transmitted I frames that are unacknowledged when the EXPAND mode command is processed remain unacknowledged and are discarded.

The Disconnect command terminates the multiple frame operation, such as when the network operator decides to take a node pair out of service or change the backup node. The node pair entity receiving the disconnect command confirms the acceptance by the transmission of an unnumbered acknowledgement response. The node pair entity sending the disconnect command terminates the multiple frame operation upon receipt of the unnumbered acknowledgment response or the disconnected mode response.

The Receive ready command indicates when a node set is ready to receive an I-frame, acknowledge previously received I frames or clear a busy condition indicated by an earlier transmission of a receive not ready command by the same node set. The Reject command is used by a node pair entity to request retransmission of I frames starting with the frame numbered N(R). The value of N(R) in the reject frame acknowledges I frames number up to and including N(R)-1. Only one rejection exception condition for a given direction of information transfer is established at a time. The Rejection condition is cleared upon the receipt of an I frame with an N(S) equal to the N(R) of the reject frame.

The receive not ready command indicates a busy condition: that is, a temporary inability to accept additional incoming I frames. The value N(R) in the receive not ready command acknowledges I-frames numbered up to and including N(R)-1. The unnumbered response acknowledges the receipt and acceptance of mode setting commands EXPAND and DISCONNECTED. The disconnected mode response reports to its peer that the heartbeat link is in a state such that multiple frame operation cannot be performed. The Frame Reject response reports an error condition not recoverable by retransmission of the identical frame.

Figure 6:
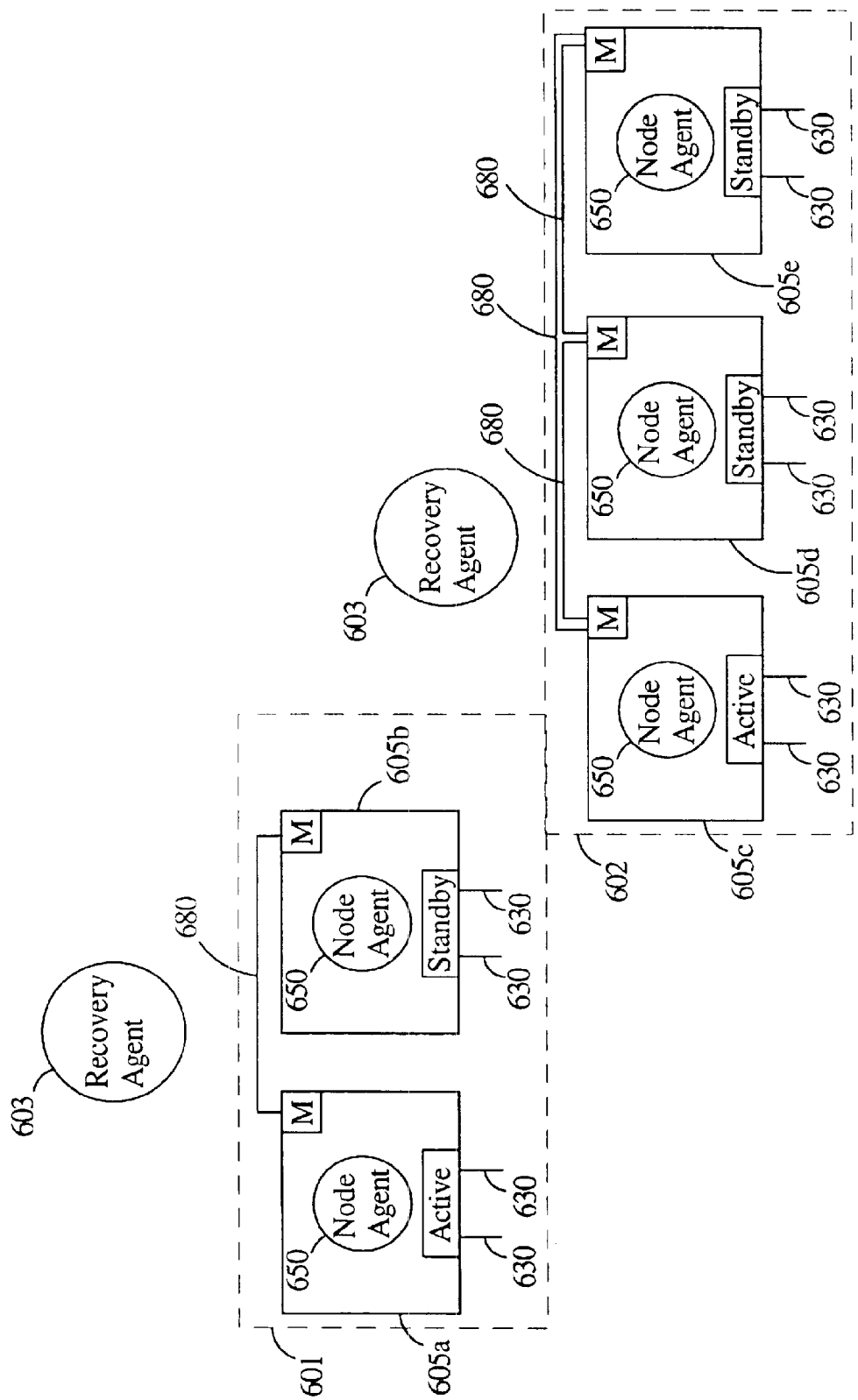
FIG. 6 is a representation of exemplary node sets employing a reliable data link.

A configuration of nodes employing a reliable data link is shown in FIG. 6. Node pair 601 includes processor nodes 605a and 605b are connected by a reliable data link 680. Similarly, node set 602 includes multiple processor nodes 605c–e which are connected by reliable data links 680. Each node contains a node agent 650 and a monitor. Again the node agent 650 is preferable an instance of C++ programming and resides on the node. The device or line interfaces relay data messages to the node agent 650, which can include externally generated automatic protection switching commands and line interface status. The node pairs or node sets also may include a recovery agent.

The node agent though the monitor accepts and filter line interface statuses and external automatic protection switching commands though the reliable data link and provide a more sophisticated communication between node agents in a node pair or set. As a result if a card failure occurs, i.e. the node goes down, the reliable data link will break, and thus like discussed earlier, the standby node will attempt to go on line, unless preempted by the supervisor node or the recovery agent. However, in case of a line failure, the data link stays up and the active processor node signals standby processor node of failure and the standby node becomes active unless preempted.

Figure 7:
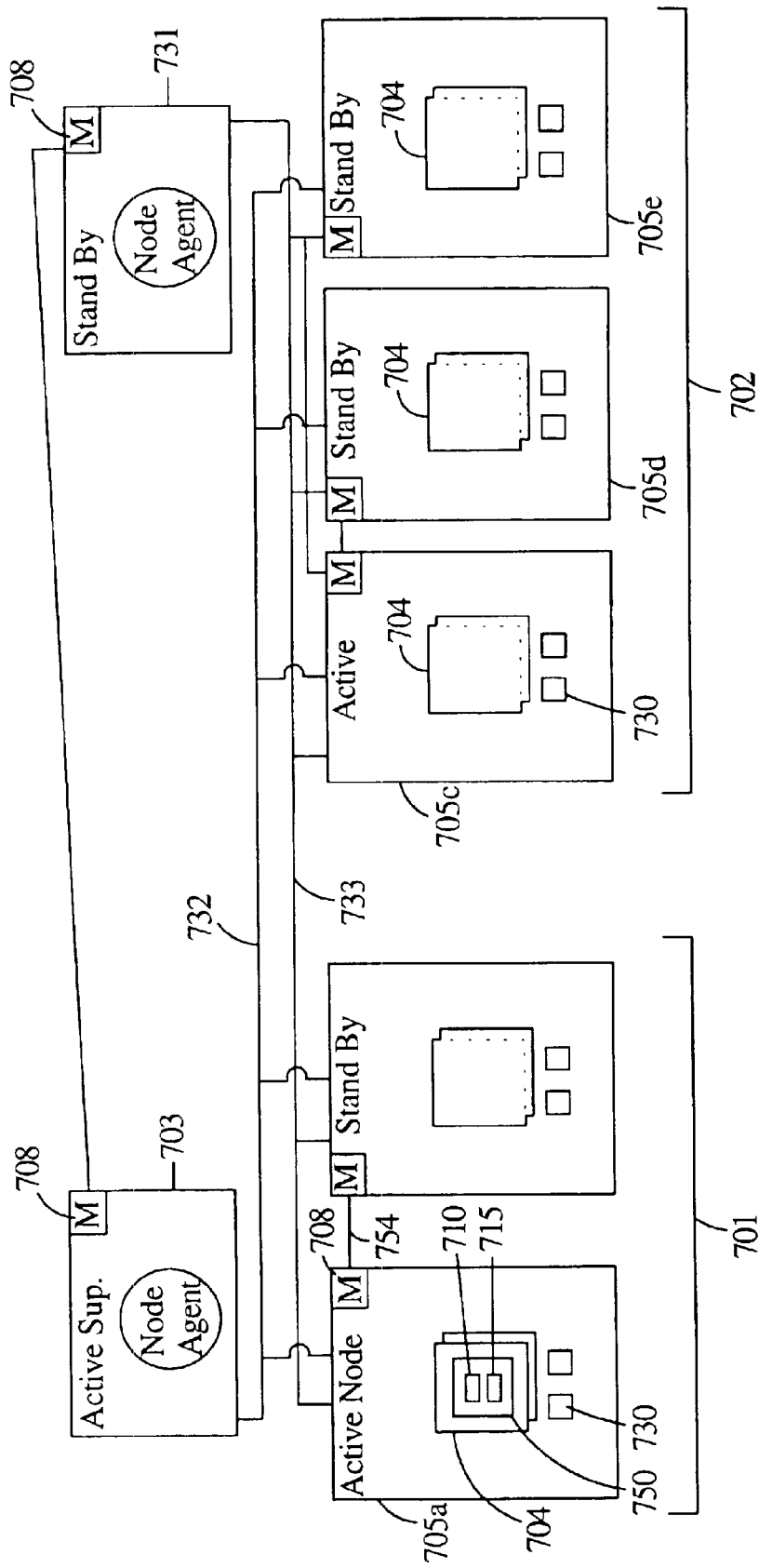
FIG. 7 is a representation of an exemplary dual redundancy protection scheme employing a redundant supervisor node and a second data bus.

FIG. 7 shows an exemplary node pair 701 and node set 702 with dual redundant supervisor nodes. Each node 705*a–e* containing a monitor 708 attached each other in the node set via a heartbeat thread 707. The nodes execute application tasks 704 implemented by agents 750, which run a primary 710 or alternate 715 routine. For each node set, one node is active while the remainders are in standby mode. The first supervisor node 730 is active and connected to the node sets via a first bus 732. The second supervisor node 731 is connected to node sets via a second bus 733. The first and the second buses are operationally connected to the processor nodes. The supervisor nodes abstractly operate much like a node pair, in that when one is active the other is in standby mode. Likewise the supervisors nodes 730 and 731 may employ the use of a heartbeat signal between their respective monitors 708. Each of the supervisor nodes is connected to the processor nodes via a different bus or buses. A multitude of addition supervisor nodes may be used, along with additional buses configure much in the same manner as described above. Implementation of more than two supervisor nodes allows for multiple redundancy in which multiple stand by supervisor nodes backup multiple active supervisor nodes.

A plurality of agents may reside upon the supervisor nodes including, as previously discussed a recovery agent, which is an instance of C++ programming. The recovery agent directs or overrides the transition of nodes between active and standby. The recovery agent fulfils one or more of the supervisory roles.

The processor and agent architecture described herein is particularly suited for use in a point-to-multi-point wireless communication system used to communicate from a central location to each of a plurality of remotes sites where reliable connections are required. Such a system that provides high speed bridging of a physical gap between a plurality of processor based systems, is ultimately dependent on the fault tolerance and recovery capability of the processors which comprise its structure.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, those features of patentable novelty that exists in the invention disclosed.

I claim:

1. A computer system implementing an extended distributed recovery block fault tolerance scheme comprising a supervisory node, an active node and a standby node wherein each said active and standby node comprises:
   a primary routine for executing a software function;
   an alternate routine for executing said software function;
   an acceptance test routine for testing the output of said primary routine and providing a control signal in response thereto;
   a device driver for receiving said control signal;
   a monitor for communicating state information with one or more active or standby nodes, and
   a node manager for determining the operational configuration of said node,
   such that said primary routine is executed in response to a determination that said node is in an active state and said alternate routine is executed in response to a determination that said node is in a standby state,
   and wherein said supervisory node coordinates the operation of said active node and said standby node,
   the improvement wherein the primary and alternate routines of one of said active or standby node are implemented with an application task comprising a plurality of agent objects each operating as a finite state machine operating in either a primary mode executing said primary routine or in an alternate mode executing said alternate routine.

2. The computer system of claim 1 wherein the primary and alternate routines of said active and standby nodes are each implemented with a separate application task.

3. The computer system of claim 1 wherein the primary and alternate routines of one of said active or standby node are implemented with a plurality of application tasks.

4. The computer system of claim 3 wherein said device driver of the node in which the primary and alternate routines are implemented with a plurality of application tasks is a plurality of device drivers.

5. The computer system of claim 4 wherein one of said application tasks includes an acceptance test routine for testing the output of said primary routines executed by said agent objects of said one application task and for providing a control signal in response thereto to one or more of said plural device drivers.

6. The computer system of claim 5 wherein each application task includes a dedicated acceptance test routine.

7. The computer system of claim 1 including a second supervisory node which operates as an alternate supervisory node to said supervisory node which operates as an active supervisory node.

8. The computer system of claim 1 wherein said computer system comprises a communication system.

9. The computer system of claim 8 wherein said communication system is a point-to-multipoint communication system.

10. The computer system of claim 9 wherein said communication system operates in the millimeter wave frequency spectrum.

11. The computer system of claim 10 wherein said communication system is a time division multiple access system for communicating data in a frame format.

12. The computer system of claim 11 wherein the data density within each frame is dynamically variable.

13. The computer system of claim 11 wherein said communication system is a time-division duplex system.

14. The computer system of claim 13 wherein said communication system is an adaptive time division duplex system.

15. The computer system of claim 14 wherein the forward/reverse ratio is dynamically configurable.

16. A computer system implementing an extended distributed recovery block fault tolerance scheme comprising a supervisory node, an active node, and a standby node, the improvement wherein primary and alternate routines of said active and standby nodes are each implemented with a plurality of dedicated application tasks each comprising a plurality of agent objects each operating as a finite state machine operating in either a primary mode executing said primary routine or in an alternate mode executing said alternate routine, and wherein the determination of the mode of operation of the agents in a one of said plural dedicated application tasks is determined independently of the mode of operation of the agents in the other of said plural dedicated application tasks.

17. The computer system of claim 16 wherein said finite state machines are each comprised of not-present, restore, stand-by, active, and out-of-service states.

18. The computer system of claim 16 wherein said computer system comprises a communication system.

19. The computer system of claim 18 wherein said communication system is a point-to-multipoint communication system.

20. The computer system of claim 19 wherein said communication system operates in the millimeter wave frequency spectrum.

21. The computer system of claim 20 wherein said communication system is a time division multiple access system for communicating data in a frame format.

22. The computer system of claim 21 wherein the data density within each frame is dynamically variable.

23. The computer system of claim 21 wherein said communication system is a time-division duplex system.

24. The computer system of claim 23 wherein said communication system is an adaptive time division duplex system.

25. The computer system of claim 24 wherein the forward/reverse ratio is dynamically configurable.

26. A computer system implementing an extended distributed recovery block fault tolerance scheme comprising a supervisory node, an active node, and a standby node, the improvement wherein the primary and alternate routines of said active and standby nodes are each implemented with a plurality of dedicated application tasks each comprising a plurality of agent objects each operating as a finite state machine operating in either a primary mode executing said primary routine or in an alternate mode executing said alternate routine, and wherein each of said agents is implemented with an attachment list comprising data common to the attachment list of at least one other agent.

27. The computer system of claim 26 wherein said finite state machines are each comprised of not-present, restore, stand-by, active, and out-of-service states.

28. The computer system of claim 26 wherein the attachment list of all of said agents comprises executable blocks of code.

29. The computer system of claim 26 wherein the attachment list of all of said agents comprises data common to all agents.

30. The computer system of claim 29 wherein the attachment lists are dynamically modifiable as a function of the status of the computer system.

31. The computer system of claim 29 wherein said agents comprise an N-to-M protection scheme.

32. The computer system of claim 31 wherein the coordination of said agents comprises passing function calls between agents.

33. The computer system of claim 31 wherein ones of said agents comprise a first set of said agents and the remaining agents comprise a second set of agents.

34. The computer system of claim 33 wherein the agents of said first set initially operate in the primary mode and wherein the agents of said second set initially operate in the alternate mode.

35. The computer system of claim 34 wherein a first predetermined number of agents in said second set protect a second predetermined number of agents in said first set.

36. The computer system of claim 35 wherein the first and second predetermined numbers are the same.

37. The computer system of claim 34 wherein each agent of said second set protects each agent of said first set.

38. The computer system of claim 34 wherein each agent of said first set operates on a dedicated data stream.

39. The computer system of claim 38 wherein ones of said agents of said second set operate on a plurality of said dedicated data streams.

40. The computer system of claim 26 wherein said computer system comprises a communication system.

41. The computer system of claim 40 wherein said communication system is a point-to-multipoint communication system.

42. The computer system of claim 41 wherein said communication system operates in the millimeter wave frequency spectrum.

43. The computer system of claim 42 wherein said communication system is a time division multiple access system for communicating data in a frame format.

44. The computer system of claim 43 wherein the data density within each frame is dynamically variable.

45. The computer system of claim 43 wherein said communication system is a time-division duplex system.

46. The computer system of claim 45 wherein said communication system is an adaptive time division duplex system.

47. The computer system of claim 46 wherein the forward/reverse ratio is dynamically configurable.

48. The computer system of claim 1, wherein said finite state machines are each comprised of not-present, restore, stand-by, active, and out-of-service states.

49. The computer system of claim 1, wherein each of said agents is implemented with an attachment list comprising data common to the attachment list of at least one other agent.

50. The computer system of claim 16, wherein each of said agents is implemented with an attachment list comprising data common to the attachment list of at least one other agent.

* * * * *